D. W. ZEHRUNG.
COMBINED SCOOP AND DUMP GATE FOR WAGONS.
APPLICATION FILED JULY 7, 1914.

1,149,014.

Patented Aug. 3, 1915.
3 SHEETS—SHEET 1.

Inventor
D. W. Zehrung,
By Victor J. Evans
Attorney

Witnesses

D. W. ZEHRUNG.
COMBINED SCOOP AND DUMP GATE FOR WAGONS.
APPLICATION FILED JULY 7, 1914.

1,149,014.

Patented Aug. 3, 1915.

3 SHEETS—SHEET 2.

Witnesses
J. H. Crawford
C. C. Hines

Inventor
D. W. Zehrung,
By Victor J. Evans
Attorney

D. W. ZEHRUNG.
COMBINED SCOOP AND DUMP GATE FOR WAGONS.
APPLICATION FILED JULY 7, 1914.
1,149,014.
Patented Aug. 3, 1915.
3 SHEETS—SHEET 3.
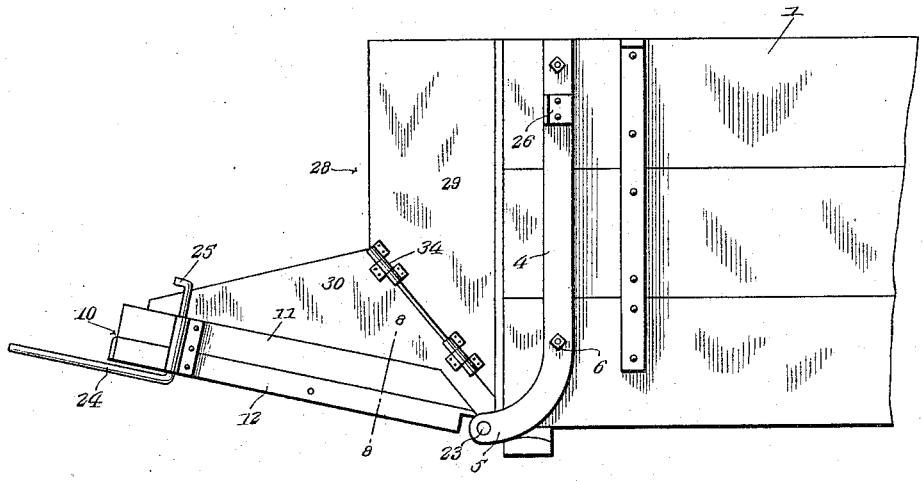
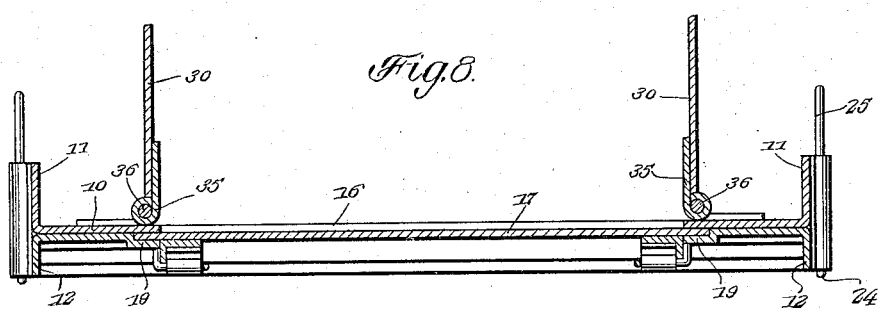
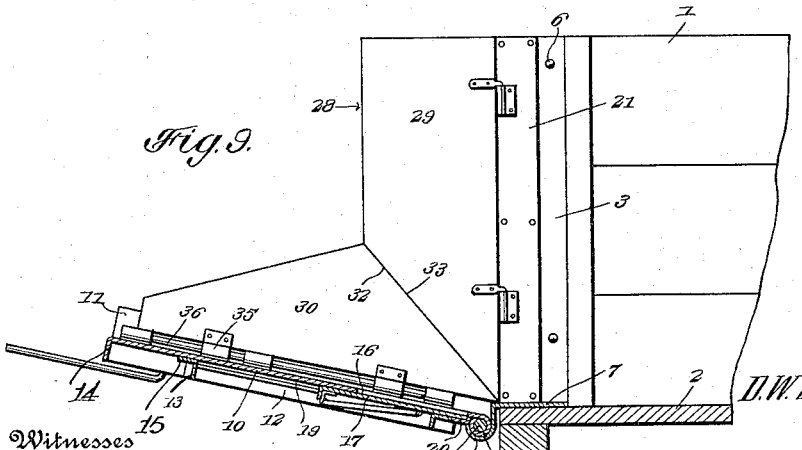
Inventor
D. W. Zehrung,
Witnesses
J. H. Crawford,
A. G. Hines.
By Victor J. Evans
Attorney

UNITED STATES PATENT OFFICE.

DELBURN W. ZEHRUNG, OF BEATRICE, NEBRASKA.

COMBINED SCOOP AND DUMP-GATE FOR WAGONS.

1,149,014.   Specification of Letters Patent.   Patented Aug. 3, 1915.

Application filed July 7, 1914. Serial No. 849,464.

*To all whom it may concern:*

Be it known that I, DELBURN W. ZEHRUNG, a citizen of the United States, residing at Beatrice, in the county of Gage and State of Nebraska, have invented new and useful Improvements in Combined Scoops and Dump-Gates for Wagons, of which the following is a specification.

This invention relates to a combined scoop and dump gate for wagons and like vehicles, the primary object of the invention being to provide an end gate which serves the function of a combined scoop or platform whereby the vehicle may be conveniently loaded and a dump gate whereby the vehicle may be conveniently emptied, the construction being such that the gate may be folded or closed in a compact position to permit the vehicle to receive a full load.

A further object of the invention is to provide a combined scoop and end gate which embodies a platform gate and folding side walls, combined with an auxiliary gate in the platform gate which may be opened without opening the platform gate for the discharge of the load, together with means for locking the platform gate in closed position.

A further object of the invention is to provide a combined loading and unloading platform end gate which is strong and durable in construction, and adapted to be conveniently operated and to prevent escape of the material at the point of connection of the gate with the body, and in which the folding side walls of the gate are designed to fold and unfold in a prescribed manner to insure certainty and ease of opening and closing movements.

The invention consists of the features of construction, combination and arrangement of parts herein fully described and claimed, reference being had to the accompanying drawings in which:—

Figure 1:
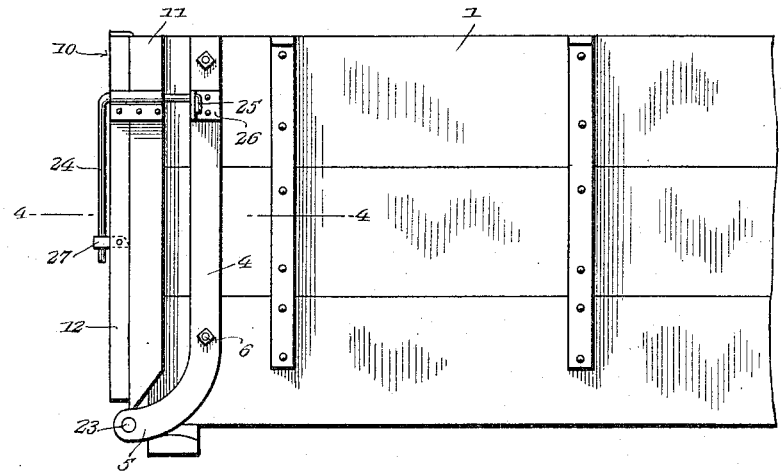
Figure 2:
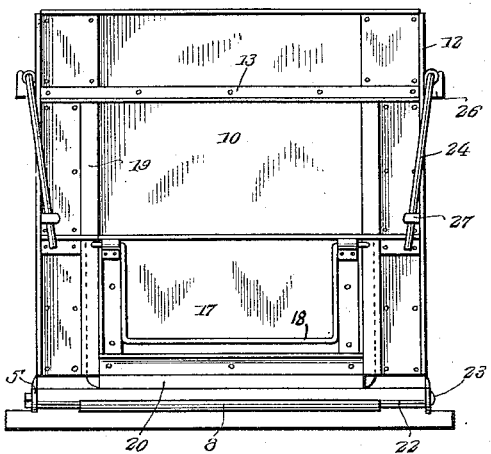
Figure 3:
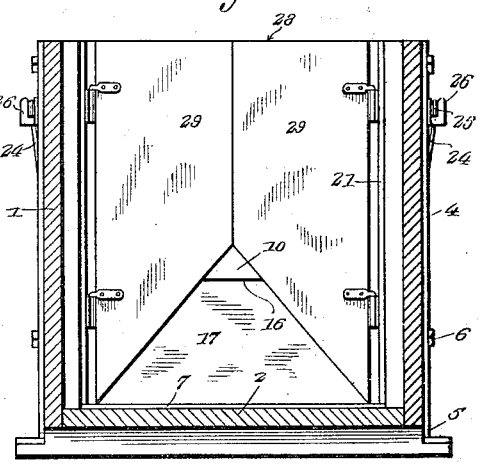
Figure 4:
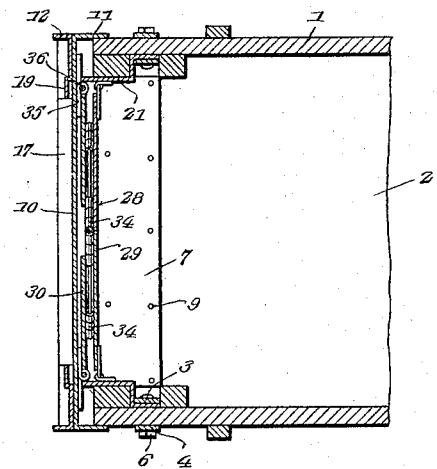
Figure 10:
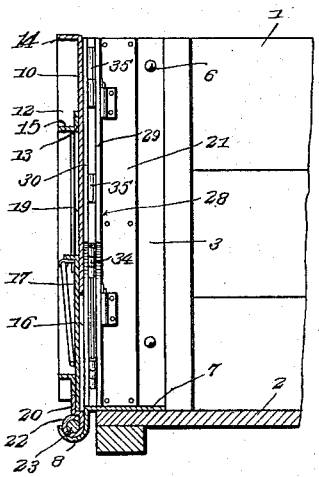
Figure 6:
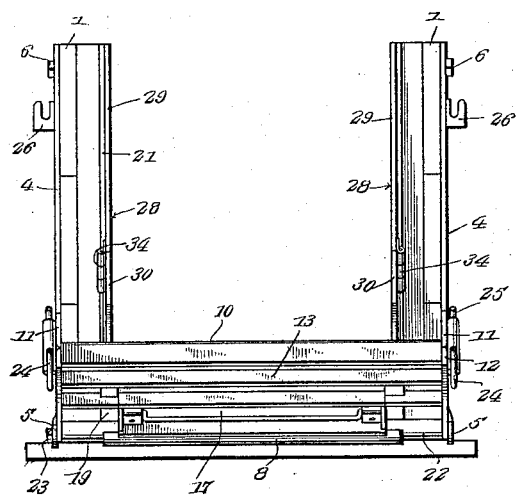
Figure 5:
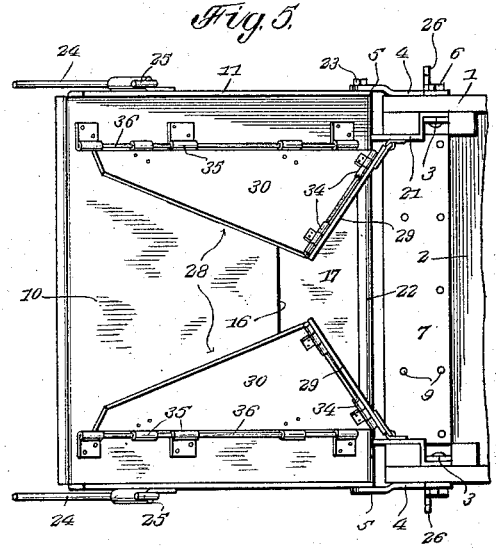

Figure 1 is a side elevation of the rear portion of a vehicle body, showing the combined scoop and dump gate closed. Fig. 2 is a rear elevation of the same. Fig. 3 is a vertical transverse section through the body looking toward the closed gate. Fig. 4 is a horizontal transverse section on the line 4—4 of Fig. 1. Fig. 5 is a top plan view showing the scoop board and folding sides of the gate in mid-open position. Fig. 6 is a rear elevation showing the gate open. Fig. 7 is a side elevation of the same. Fig. 8 is a vertical transverse section on the line 8—8 of Fig. 7. Fig. 9 is a vertical longitudinal section through the combined scoop and gate as shown in Fig. 6. Fig. 10 is a similar section through the combined scoop and gate as shown in Fig. 1.

Referring to the drawings, 1 represents the sides and 2 the bottom of the wagon or other like vehicle body. Secured to the inner faces of the sides adjacent to the open rear end of the body are bracing irons 3, and secured to the outer faces of the said sides 1 in transverse alinement with the said irons 3 are bracket irons 4 provided with rearwardly curved lower ends 5 extending outwardly beyond the open end of the body, the said irons being firmly fastened in position by bolts or other suitable fastening elements 6. Also fastened to the bottom 2 is a reinforcing and wear plate 7, hereinafter termed a sill plate, which has its outer longitudinal edge projecting beyond the open end of the body and formed to provide a channeled or hook-shaped guard flange 8, said plate being secured in position by screws or other suitable fastenings 9.

The combination gate and chute comprises a main gate or platform 10, constructed of sheet metal or other suitable material, in the present instance said main gate or platform is shown as comprising a body of sheet metal having inwardly extending side flanges 11 adapted to overlap the sides of the body when the gate is closed, to hold the gate firmly against lateral play or strain. The gate or platform is reinforced by vertical plates 12 and a transverse angle metal reinforcing bar or strip 13, which are riveted thereto. The gate body is formed at its upper end with an outwardly extending reinforcing flange 14; while the plates 13 are provided with rearwardly extending reinforcing flanges 15, increasing the strength and general durability of the gate structure. In the lower portion of the gate body is formed an outlet opening 16, through which the contents of the vehicle may be discharged when it is not desired to open the main gate, which opening is controlled and closed by the auxiliary gate or door 17. This auxiliary gate or door is provided with a bail handle 18 by which it may be raised and lowered and is slidably fitted at its side edges in guideways 19 formed between the gate body and the plates 12 and is limited in its upward motion by the strip or bar 13 and closes at its lower edge against an outwardly bent flange 20 at the base of the opening, whereby the opening will be securely sealed. The auxiliary gate may be constructed of metal reinforced in any suitable manner and lies within the space bounded by the strip 13 and reinforcing flanges 15, so as to avoid projection of said auxiliary gate beyond the plane of the main gate or platform, whereby possibility of injury to the auxiliary gate by contact with extraneous objects is diminished.

Secured to the inner faces of the sides 1 are combined bracket and spacing plates 21 which project beyond the open end of the vehicle body for contact with the main gate or platform when said main gate or platform is closed, thus limiting the closing movement of said main gate or platform and at the same time closing the spaces at the sides against the escape of the contained material in the body. The lower edge of the main gate or platform is rolled to form a bead 22 which engages a cross pin or bolt 23 detachably fitted in the curved ends 5 of the bracket irons 4, whereby the gate is pivotally mounted and may be detached upon removing said bolt or pin, as will be readily understood. The bead 22 rests within and is partially embraced by the channeled flange 8 of the sill plate 7, by which the gate is braced along the line of its pivotal connection and the joint closed to prevent escape of the contained material between the lower edge of the gate and the sill plate. Locking levers 24 are pivotally mounted on the sides of the gate and have hooked ends 25 to engage notched keeper brackets 26 on the irons 3, whereby the gate may be locked in closed position. The handle ends of these levers are adapted to be engaged by pivoted catches 27 on the gate, by which the levers may be secured against casual displacement when in locking position. Upon releasing said catches the handle ends of the levers may be thrown outward to disengage the hooked end of the levers from the keeper brackets, whereupon the main gate or platform may be swung outwardly to open position, in which it inclines to a determined degree downwardly and forwardly toward the open end of the body to facilitate the introduction of the material placed thereon.

The gate 10 is connected with the sides of the vehicle body by folding side walls 28 coöperating with the gate to provide a chute. Each of these side walls comprises a vertical plate 29 and a horizontal plate 30. The vertical plates 29 are detachably hinged at their inner edges to the plates 21, and the lower end of each vertical plate is cut away at an oblique angle, as shown at 32, while the inner end of the coöperating horizontal plate is similarly cut away, as at 33, said oblique ends of the plates being hingedly connected as at 34, thus adapting said plates to fold and unfold in the opening and closing movements of the gate as hereinafter described. The horizontal plates 30 are of substantially triangular form and are provided at their lower edges with hinged loops 35 which slidably and pivotally engage hinge rods 36 disposed upon the inner surface of the gate adjacent to and parallel with the side edges thereof, whereby said plates are mounted for both swinging and sliding movements on the rods 36. Thus when the gate or platform is swung outwardly the side wall plates will be swung outwardly to form walls at opposite sides thereof, whereby a chute construction is produced, while when the gate or platform is swung inwardly to closed position the side wall sections will be folded or collapsed on each other so as to lie in compact compass parallel with the gate the brackets 21 limiting the inward movement of the gate to avoid strain upon the hinges of the wall plate. It will be evident that the described motions of the chute plates render it necessary that the horizontal plates shift to a determined extent inwardly and outwardly along the platform in the opening and closing movements of the parts. This is permitted by the sliding and pivotal engagement between the keeper loops 35 and rods 36, as will be readily understood.

It will of course be apparent that the combined gate and chute is adapted for use upon an ordinary wagon or like vehicle as a loading and dumping platform, on which the workmen may stand and that the device may also be employed upon dumping carts and other vehicles, so that the chute formed thereby will guide the load in its discharge. It will also be apparent that the auxiliary gate may be opened for the discharge of portions of the load without opening the main gate, and that when the main gate is closed the parts are disposed in compact shape at the rear of the vehicle and prevent leakage and waste of the material therefrom. It will be evident that the hinged connection of the main gate and the folding structure of the side walls of the chute are such as to permit the gate and folding walls to be opened and closed in an easy and convenient manner.

I claim:—

The combination, with a vehicle body, of a swinging platform gate, guide rods upon said platform gate, locking means for holding the gate in closed position, and chute forming walls between the sides of the body and the gate, each comprising a section hinged to the body and a section slidably and pivotally engaging the adjacent guide rod on the platform gate, said sections having their adjacent edges pivotally connected on oblique lines to fold and unfold in the closing and opening movements of the gate.

In testimony whereof I affix my signature in presence of two witnesses.

DELBURN W. ZEHRUNG.

Witnesses:
L. C. BARNES,
J. S. WYLIE.

Copies of this patent may be obtained for five cents each, by addressing the "Commissioner of Patents, Washington, D. C."